United States Patent
Hsieh et al.

(10) Patent No.: US 10,782,895 B2
(45) Date of Patent: Sep. 22, 2020

(54) MANAGEMENT METHOD OF METADATA FOR PREVENTING DATA LOSS AND MEMORY DEVICE USING THE SAME

(71) Applicant: Wiwynn Corporation, New Taipei (TW)

(72) Inventors: Cheng-Kuang Hsieh, New Taipei (TW); Chia-Hao Hsu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 15/976,839

(22) Filed: May 10, 2018

(65) Prior Publication Data
US 2019/0250833 A1 Aug. 15, 2019

(30) Foreign Application Priority Data
Feb. 13, 2018 (TW) .............................. 107105204 A

(51) Int. Cl.
G06F 12/02 (2006.01)
G06F 3/06 (2006.01)
G06F 12/1009 (2016.01)

(52) U.S. Cl.
CPC ............ *G06F 3/0619* (2013.01); *G06F 3/064* (2013.01); *G06F 3/0679* (2013.01); *G06F 12/1009* (2013.01); *G06F 2212/1032* (2013.01)

(58) Field of Classification Search
CPC ...... G06F 3/0619; G06F 3/064; G06F 3/0679; G06F 12/1009; G06F 2212/1032
See application file for complete search history.

(56) References Cited

U.S. PATENT DOCUMENTS

| 7,873,619 | B1 | 1/2011 | Faibish |
| 8,572,310 | B2 | 10/2013 | Oh |
| 2006/0294339 | A1 | 12/2006 | Trika |
| 2007/0094445 | A1 | 4/2007 | Trika |
| 2011/0231596 | A1* | 9/2011 | Goss ................... G06F 12/0246 711/103 |
| 2013/0042056 | A1* | 2/2013 | Shats .................. G06F 12/0246 711/103 |

(Continued)

FOREIGN PATENT DOCUMENTS

| CN | 105917308 A | 8/2016 |
| TW | 201337735 A | 9/2013 |

(Continued)

*Primary Examiner* — Tasnima Matin
(74) *Attorney, Agent, or Firm* — Winston Hsu

(57) ABSTRACT

A metadata management method for a memory device includes generating a virtual address layer in a memory space of a non-volatile memory of the memory device; establishing a mapping table in the virtual address layer to store at least one metadata corresponding to at least one storing block, wherein the at least one storing block comprises at least one physical address and the at least one physical address is related to the memory space; when writing at least one datum to the memory device, writing the at least one datum to at least one memory block of the memory space according to the at least one physical address; and updating the at least one metadata of the at least one storing block when finishing writing the at least one datum.

8 Claims, 7 Drawing Sheets

(56) References Cited

U.S. PATENT DOCUMENTS

2015/0193302 A1* 7/2015 Hyun .................... G11C 29/52
714/764
2016/0118143 A1* 4/2016 Muchherla ....... G11C 29/50004
714/721

FOREIGN PATENT DOCUMENTS

TW 201738752 A 11/2017
TW I613652 B 2/2018

* cited by examiner

MANAGEMENT METHOD OF METADATA FOR PREVENTING DATA LOSS AND MEMORY DEVICE USING THE SAME

BACKGROUND OF THE INVENTION

1. Field of the Invention

The present invention relates to a management method of metadata and memory device using the same, and more particularly, to a management method of metadata and memory device capable of providing power loss protection.

2. Description of the Prior Art

Under a memory storage structure of a conventional solid state disk (SSD), there are two kinds of data when performing data access, one of them is data-to-be-accessed and the other one is metadata, wherein the contents of the metadata are addresses of the data. Please refer to FIG. 1, which is a timing diagram of a data access process of a memory device. As shown in FIG. 1, a host sends out a write request to an SSD controller, so as to write the data into a dynamic random access memory (DRAM) and a flash memory. After the flash memory informs the SSD controller of finishing writing the data with a message, the host requests the SSD controller to update the metadata, and the SSD controller updates the metadata to the flash memory. However, when the SSD is shut down because of abnormal power supply and the data are not yet stored into the flash memory, a consumer SSD cannot protect the data, which results in data loss and causes inconveniences to users.

Therefore, how to provide a management method of metadata and memory device using the same, which protects the data when the consumer SSD is shut down, has become one of important issues in the field.

SUMMARY OF THE INVENTION

Therefore, the present invention provides a management method of the metadata and a memory device using the same, so as to provide the ability of power loss protection to the consumer SSDs, and avoid the data loss caused by the power loss.

The present invention discloses a metadata management method for a memory device, comprising generating a virtual address layer in a memory space of a non-volatile memory of the memory device; establishing a mapping table in the virtual address layer to store at least one metadata corresponding to at least one storing block, wherein the at least one storing block comprises at least one physical address and the at least one physical address is related to the memory space; when writing at least one datum to the memory device, writing the at least one datum to at least one memory block of the memory space according to the at least one physical address; and updating the at least one metadata of the at least one storing block when finishing writing the at least one datum.

The present invention further discloses a memory device, comprising a non-volatile memory, for providing a memory space, the memory space comprises a plurality of memory blocks; a dynamic random access memory; and a memory controller, coupled to the dynamic random access memory, for executing a management process to write data of the dynamic random access memory into the memory device, wherein the management process comprises generating a virtual address layer in the memory space; establishing a mapping table in the virtual address layer to store at least one metadata corresponding to at least one storing block, wherein the at least one storing block comprises at least one physical address and the at least one physical address is related to the memory space; when writing at least one datum to the memory space, writing the at least one datum to at least one memory block of the plurality of memory blocks according to the at least one physical address; and updating the at least one metadata of the at least one storing block when finishing writing the at least one datum.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
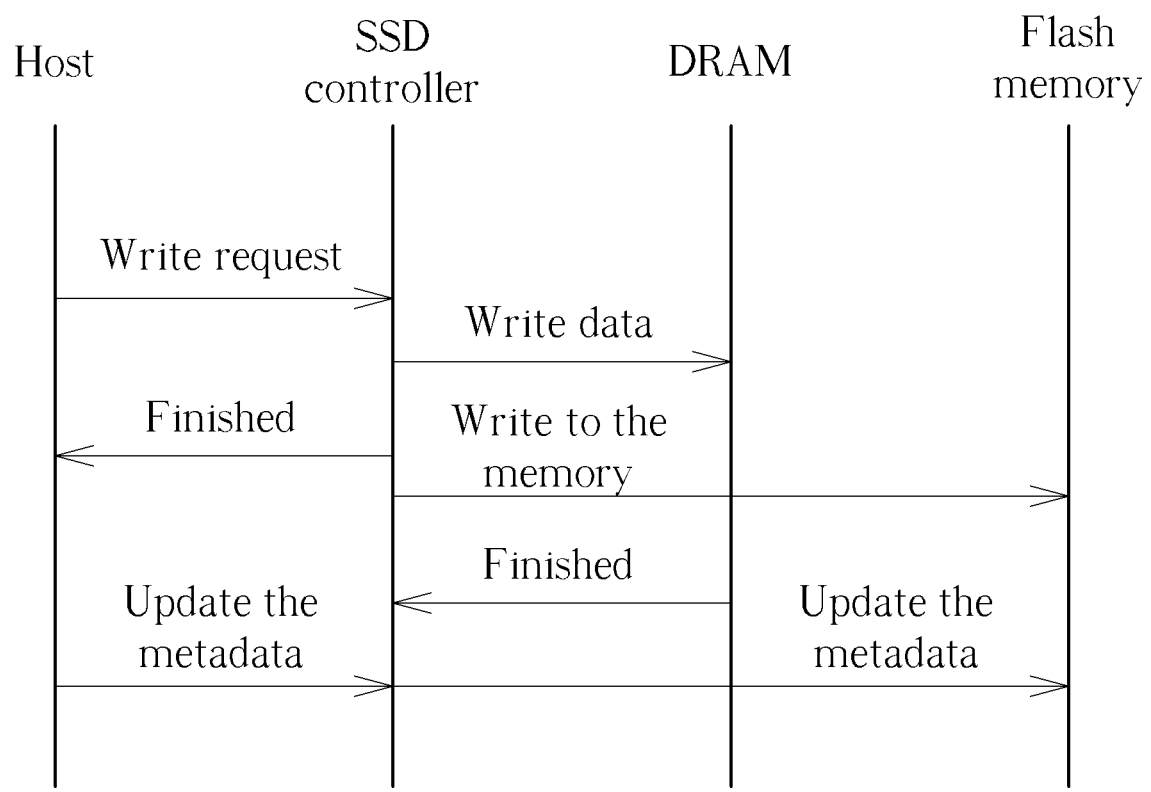
FIG. 1 is a timing diagram of a data access process of a memory device.
Figure 2:
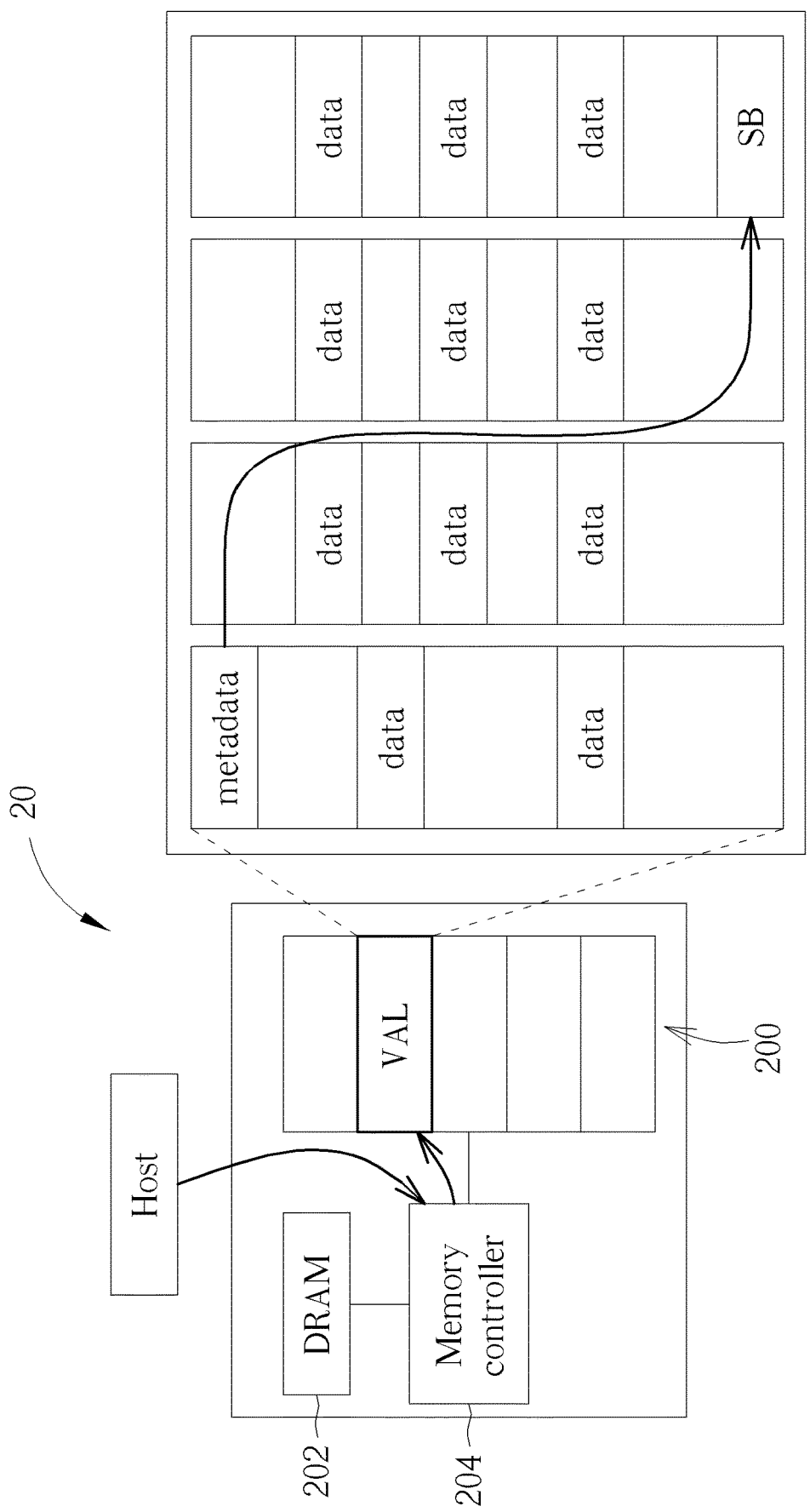
FIG. 2 is a schematic diagram of a memory device according to an embodiment of the present disclosure.

Please refer to FIG. 2, which is a schematic diagram of a memory device 20 according to an embodiment of the present disclosure. The memory device 20 includes a non-volatile memory (NVM) 200, a dynamic random access memory (DRAM) 202 and a memory controller 204. In an embodiment, the memory device 20 may be a solid state disk (SSD), and the NVM 200 may be composed of a plurality of flash memory arrays, where the NVM 200 is a major storing region. The NVM 200 provides a memory space, which includes a plurality of memory blocks. Therefore, when a host is going to write data, the host sends a write request to the memory controller 204 so as to write the data into the memory space of the NVM 200. After the memory controller 204 writes the data into the memory space of the NVM 200, the memory controller 204 updates the metadata of the memory space of the NVM 200 where the data stored. However, when the SSD is shut down because of abnormal power supply and the data are not yet stored into the flash memory arrays, consumer SSDs (i.e. not enterprise SSDs) cannot protect the data by hardware devices (e.g. plugin capacitors) and result in data loss. Under the circumstance, to avoid the data loss, the memory controller 204 of the present disclosure may adaptively update the metadata to prevent occurrence of the above mentioned circumstance.

In detail, the memory controller 204 of the memory device 20 generates a virtual address layer VAL in the memory space of the NVM 200, and establishes a mapping table MT in the virtual address layer VAL to store at least one metadata corresponding to at least one storing block SB, wherein the storing block SB includes at least one physical address, which is related to the memory space of the NVM 200. Therefore, when the host writes at least one datum into the memory space of the NVM 200, the memory controller 204 may find the corresponding storing block SB according to the metadata in the mapping table MT, and then write the datum into at least one memory block of the memory space of the NVM 200 according to the physical address of the storing block SB. After finishing writing the datum, the memory controller 204 updates the metadata corresponding to the storing block SB in the mapping table MT. As such, even if the datum is not yet stored into the flash memory of the memory space of the NVM 200 before power loss, the memory device 20 of the present disclosure may determine the physical address where the datum is stored, to read the datum according to the metadata related to the storing block SB in the mapping table MT after the memory device 20 is recovered.

The example stated above briefly illustrates that the memory device of the present disclosure protects the datum in the situation of power loss so as to avoid the data loss. Notably, those skilled in the art may make proper modifications to the memory device according to different system requirements, and not limited thereto, which all belongs to the scope of the present disclosure.

Figure 3:
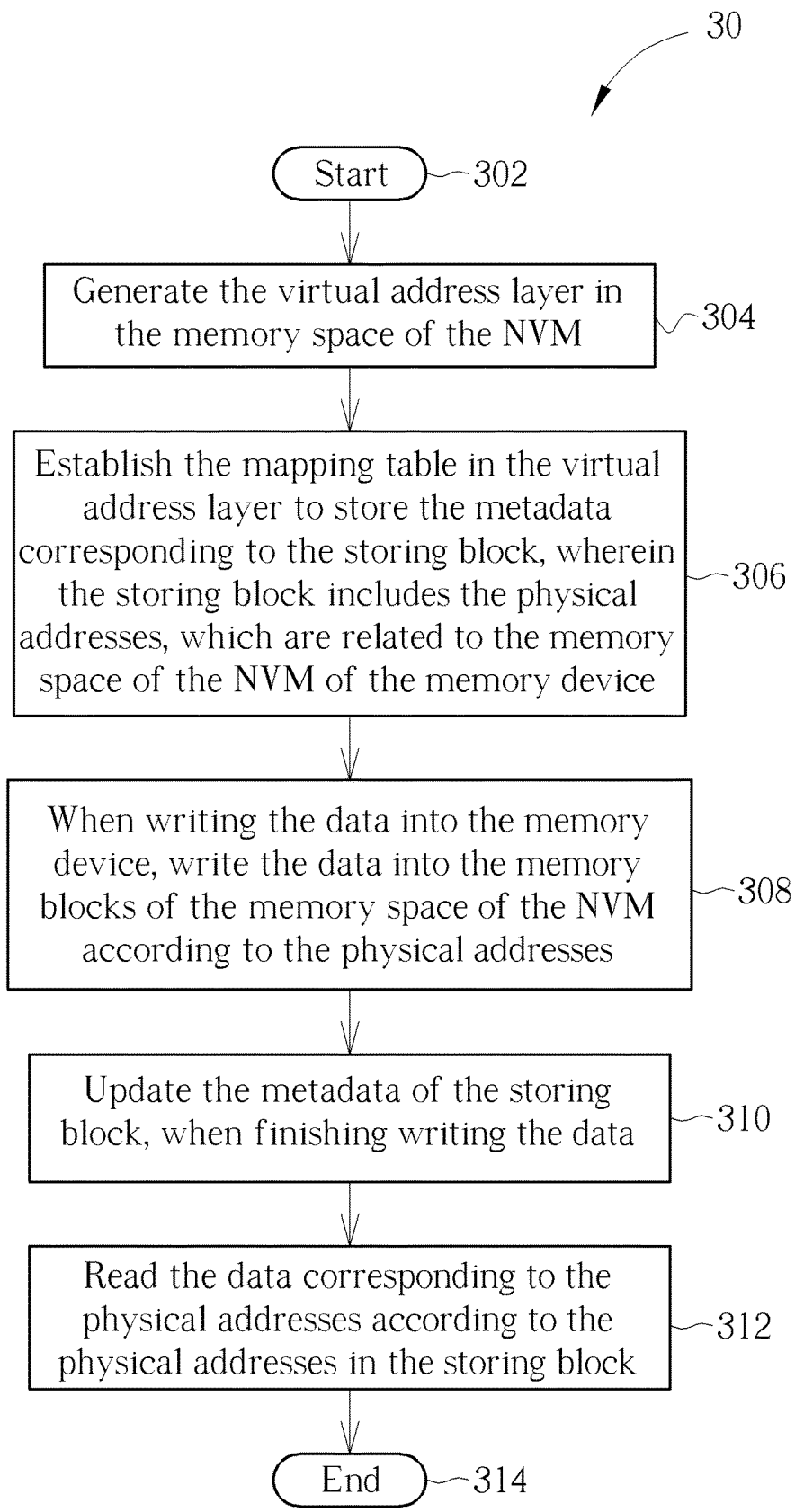
FIG. 3 is a schematic diagram of a management process of metadata according to an embodiment of the present disclosure.

In more detail, please refer to FIG. 3, which is a schematic diagram of a management process 30 of the metadata according to an embodiment of the present disclosure. The management process 30 of the metadata may be compiled as program codes and applied on the memory device 20, so as to access or write the data according to the metadata, the management process 30 includes the following steps:

Step 302: Start.

Step 304: Generate the virtual address layer VAL in the memory space of the NVM 200.

Step 306: Establish the mapping table MT in the virtual address layer VAL to store the metadata corresponding to the storing block SB, wherein the storing block SB includes the physical addresses, which are related to the memory space of the NVM 200 of the memory device 20.

Step 308: When writing the data into the memory device 20, write the data into the memory blocks of the memory space of the NVM 200 according to the physical addresses.

Step 310: Update the metadata of the storing block SB, when finishing writing the data.

Step 312: Read the data corresponding to the physical addresses according to the physical addresses in the storing block SB.

Step 314: End.

Figure 4:
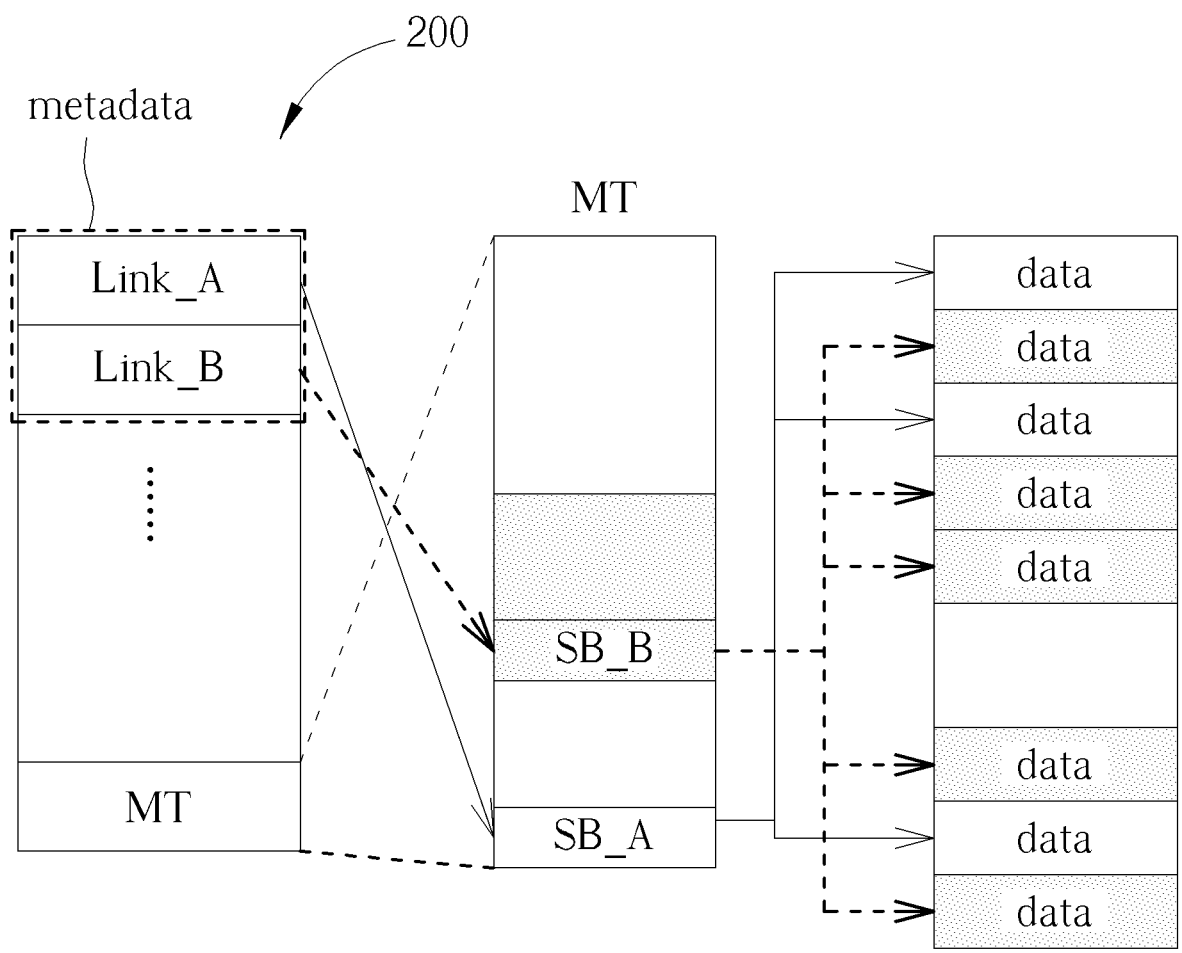
FIG. 4 is a schematic diagram of a mapping table according to an embodiment of the present disclosure.

As can be known from the above, the memory device 20 stores the physical addresses of the memory blocks, which are utilized for storing the data, into the storing block SB based on the management process 30, such that the host searches the physical addresses stored in the storing block SB via the mapping table MT to read the data, and further avoid the data loss caused by the abnormal shut down and recovery of the memory device 20. In an embodiment, first, in step 304, the memory controller 204 adds the virtual address layer VAL and establishes the mapping table MT in the mapping table MT to store the metadata corresponding to the storing block SB, wherein the storing block SB includes the physical addresses of the memory space of the NVM 200 utilized for storing the data. Since the mapping table MT has pointer data corresponding to the storing block SB, the memory controller 204 searches the pointer data related to the storing block SB in the mapping table MT, so as to correspond to the storing block SB, and to read the physical addresses corresponding to different data. For example, please refer to FIG. 4, which is a schematic diagram of the mapping table MT according to an embodiment of the present disclosure. As shown in FIG. 4, the mapping table MT includes pointer data Link_A, Link_B corresponding to the storing block SB_A, SB_B, and the storing blocks SB_A, SB_B respectively include the physical addresses corresponding to the memory block for storing the data.

Then, in step 308, when the host is going to write the data into the memory device 20, the memory controller 204 writes the data into the memory blocks corresponding to the memory space of the NVM 200 of the memory device 20 according to the physical addresses of blank storing block SB_B, and waits for an update command of the mapping table MT to update the pointer data Link_B in the mapping table MT. Therefore, the pointer data Link_B is not yet established in the mapping table MT; in this situation, when the memory device 20 is suddenly shut down and recovered, the memory controller 204 may recover the pointer data Link_B by searching the mapping table MT, so as to retrieve the physical addresses, utilized for writing the data, corresponding to the storing block SB_B. Then, in step 310, when finishing writing the data, the memory controller 204 updates the metadata related to the storing block SB in the mapping table MT. Furthermore, when the host is going to read the data in the memory device 20, the memory controller 204 reads the metadata related to the storing block SB in the mapping table MT, so as to find the physical addresses, utilized for storing the data, in the storing block SB and to read the data.

Figure 5:
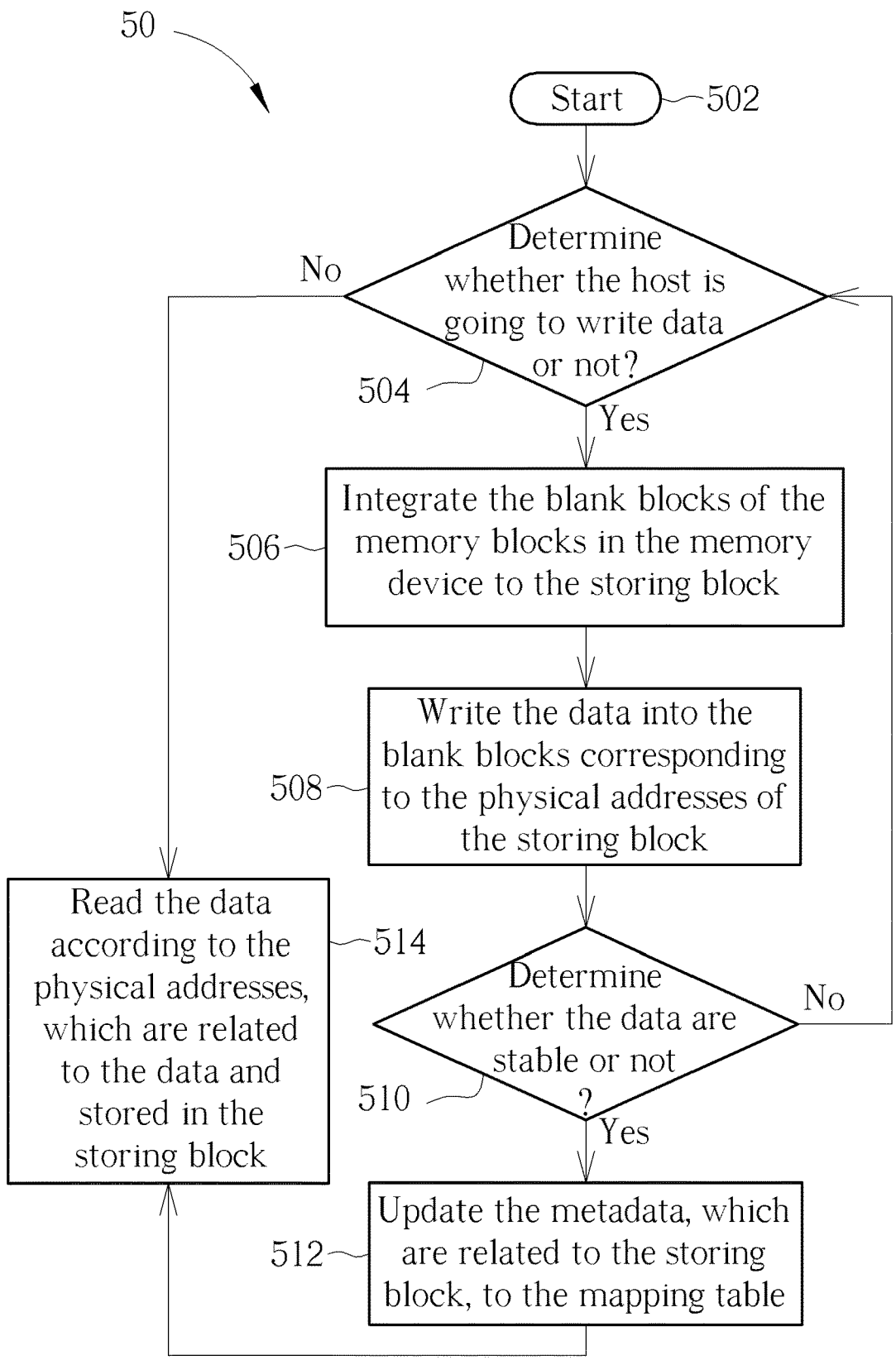
FIG. 5 is a schematic diagram of another management process of the metadata according to an embodiment of the present disclosure.

According to different applications and design concept, the memory device 20 may be implemented in all kinds of methods. For example, please refer to FIG. 5, which is a schematic diagram of another management process 50 of the metadata according to an embodiment of the present disclosure. The management process 50 may be compiled as program codes and applied on the memory device 20, which includes the following steps:

Step 502: Start.

Step 504: Determine whether the host is going to write data or not. If yes, execute step 506; if not, execute step 514.

Step 506: Integrate the blank blocks of the memory blocks in the memory device 20 to the storing block SB.

Step 508: Write the data into the blank blocks corresponding to the physical addresses of the storing block SB.

Step 510: Determine whether the data are stable or not. If yes, execute step 512; if not, execute step 504.

Step 512: Update the metadata, which are related to the storing block SB, to the mapping table MT.

Step 514: Read the data according to the physical addresses, which are related to the data and stored in the storing block SB.

Figure 6:
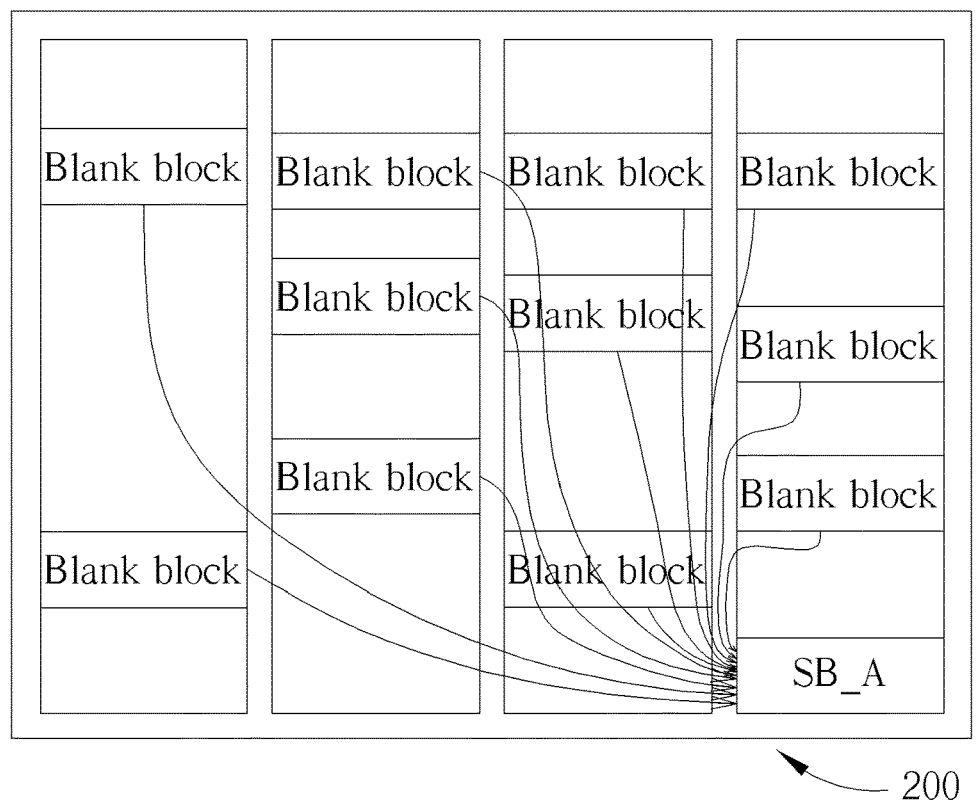
FIGS. 6 and 7 are schematic diagrams of a virtual address layer in a memory space of a non-volatile memory of the memory device according to an embodiment of the present disclosure.
Figure 7:
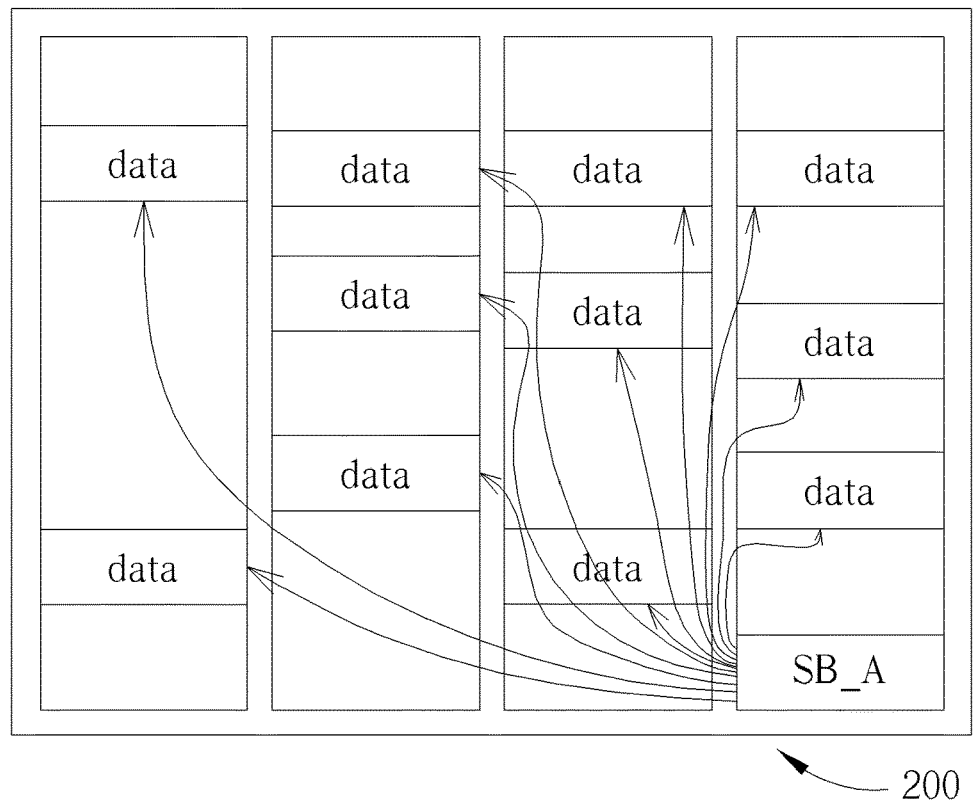

Based on the management process 50, when the host is going to write or read the data, the memory device 20 may search the corresponding storing block SB according to the pointer data Link stored in the mapping table MT so as to determine the physical addresses to write the data or read the data by the storing block SB. In detail, in step 504, the memory controller 204 determines that the host is going to write or read the data. Then, please refer to FIGS. 6 and 7, which are schematic diagrams of the virtual address layer VAL in the memory space of the NVM 200 according to an embodiment of the present disclosure. As shown in FIG. 6, in step 506, when the host is going to write the data, the memory controller 204 integrates the physical addresses of the blank blocks of the memory blocks of the memory space of the NVM 200 as the storing block SB_A. Next, as shown in FIG. 7, in step 508, the controller 204 writes the data into the blank blocks corresponding to the physical addresses of the storing block SB_A. After writing the data into the black blocks of the memory space of the NVM 200, in step 510, the memory controller 204 determines whether the data are stable (i.e. writing the data is finished) or not. If the data are not stable, which represents that there exists data to be written, execute step 504. In contrast, if the data are finished writing, the memory controller 204 updates the metadata, which are related to the storing block SB_A, to the mapping table MT. As such, when the host reads the mapping table MT, the host may find the physical addresses corresponding to the data in the storing block SB_A to read the data. On the other hand, when the host reads the data, in step 514, the host reads the data corresponding to the physical addresses, according to the physical addresses, which are related to the data and stored in the storing block SB.

As can be known from the above, the memory device 20 integrates the blank blocks of the memory space of the NVM 200 as the storing block SB, wherein the black blocks are arbitrary fetched from the memory space of the NVM 200 of the memory device 20. In addition, as shown in FIGS. 6 and 7, the storing block SB is stored from an end of the memory block of the memory device 20. That is, after the memory device 20 is shut down and recovered, the host recovers the data by searching the storing block SB from the end of the memory space of the NVM 200. Therefore, the memory device 20 may avoid the circumstance of the data loss because of the abnormal shutdown and recovery.

Figure 8:
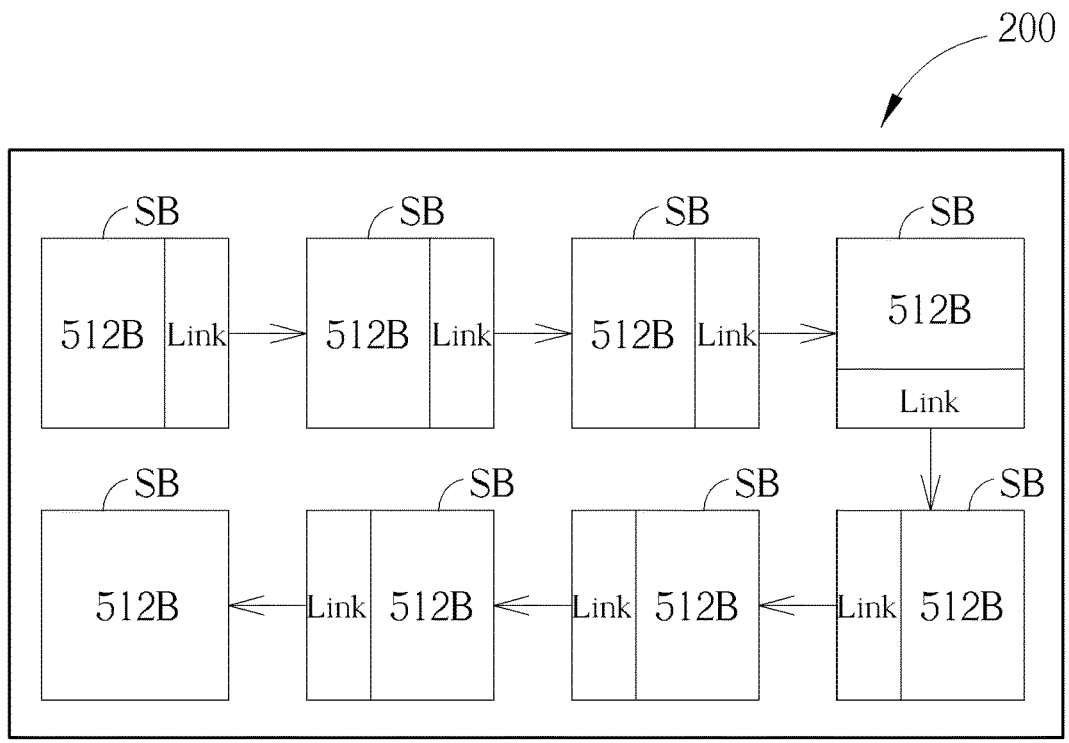
FIG. 8 is a schematic diagram of a link list according to an embodiment of the present disclosure.

The memory device 20 may be implemented in all kinds of methods according to different applications and design concepts. For example, when a size of the metadata exceeds a storage space of the mapping table MT, the memory controller 204 may establish a link list to link the storing blocks SB. In other words, linking the storing blocks SB may increase the storage space to store the metadata. More specifically, take a 32-bit computer system (i.e. a file system of 512 bytes per unit capacity) as an example, if a memory length is 4 bytes, a single mapping table MT may store an amount of 128 stacks of the metadata, wherein each of the metadata may store 512 bytes. Therefore, the single mapping table MT may store 65536 bytes data. In this situation, if the size of the metadata exceeds the storage space of the single mapping table MT (i.e. 65536 bytes), the memory controller 204 establishes the link list. Please refer to FIG. 8, which is a schematic diagram of a link list according to an embodiment of the present disclosure. As shown in FIG. 8, the link list links the storing blocks SB by the pointer data Link of each of the storing blocks SB. In this example, since each of the storing blocks SB has 512 bytes, the storage space after linking all of the storing blocks SB is 4096 bytes.

Figure 9:
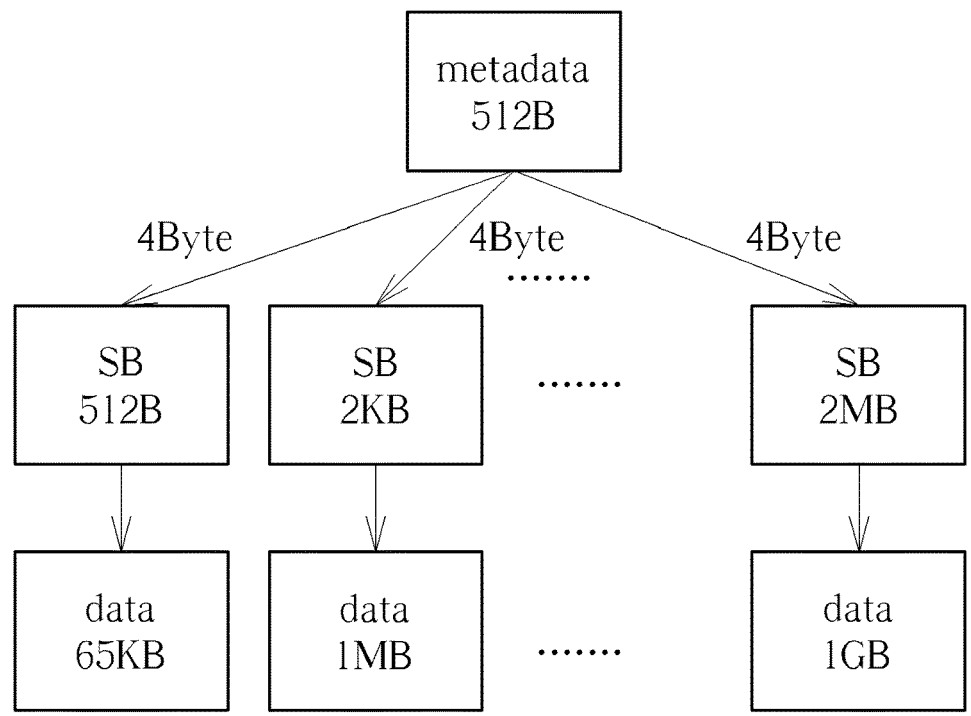
FIG. 9 is a schematic diagram of a mapping structure according to an embodiment of the present disclosure.

In addition, in the above mentioned embodiment, since the mapping table MT may at most store 128 stacks of metadata, an update of the metadata is executed when up to 128 stacks of metadata are all accessed. Specifically, please refer to FIG. 9, which is a schematic diagram of a mapping structure according to an embodiment of the present disclosure. As shown in FIG. 9, the metadata may at most include 128 stacks, wherein each stack of the metadata corresponds to the storing blocks SB with different sizes, and each of the storing blocks SB corresponds to the data stored in different memory blocks.

Notably, the embodiment stated above are to illustrate the concept of the present disclosure, those skilled in the art may make proper modifications to the present disclosure according to different system requirements, and not limited thereto. According to different applications and design concepts, the memory device and the management method of the metadata may be implemented in all kinds of methods. For example, the access method of the storing blocks of the mapping table in the memory space of the NVM is not limited to be stored from the end of the memory space of the NVM, the data with different attributes may be allocated in different storing blocks or so, and not limited thereto, which all belong to the scope of the present disclosure.

In summary, the present disclosure provides the management method of the metadata and the memory device using the same, which particularly provides the power loss protection so as to provide a better usage scenario to users.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A metadata management method for a memory device, comprising:
    generating a virtual address layer in a memory space of a non-volatile memory of the memory device;
    establishing a mapping table in the virtual address layer to store at least one metadata corresponding to at least one storing block, wherein the at least one storing block comprises at least one physical address and the at least one physical address is related to the memory space;
    when writing at least one datum to the memory device, writing the at least one datum to at least one memory block of the memory space according to the at least one physical address;
    updating the at least one metadata of the at least one storing block when finishing writing the at least one datum; and
    reading, according to the at least one metadata corresponding to the at least one storing block, data corresponding to the at least one physical address after the memory device is shut down and recovered;
    wherein the at least one memory block is at least one blank block of the memory space;
    wherein the at least one storing block is stored from an end of the memory space.

2. The management method of claim 1, further comprising:
    reading data corresponding to the at least one physical address according to the at least one physical address of the at least one storing block.

3. The management method of claim 1, wherein the at least one metadata corresponds to pointer data of the at least one storing block.

4. The management method of claim 1, further comprising:
    establishing a link list to link the at least one storing block when a size of the at least one metadata exceeds a storage space of the mapping table.

5. A memory device, comprising:
    a non-volatile memory, for providing a memory space, the memory space comprises a plurality of memory blocks;
    a dynamic random access memory; and
    a memory controller, coupled to the dynamic random access memory, for executing a management process to write data of the dynamic random access memory into the memory device, wherein the management process comprises:

generating a virtual address layer in the memory space;

establishing a mapping table in the virtual address layer to store at least one metadata corresponding to at least one storing block, wherein the at least one storing block comprises at least one physical address and the at least one physical address is related to the memory space;

when writing at least one datum to the memory space, writing the at least one datum to at least one memory block of the plurality of memory blocks according to the at least one physical address;

updating the at least one metadata of the at least one storing block when finishing writing the at least one datum; and reading and searching, according to the at least one metadata corresponding to the at least one storing block, data corresponding to the at least one physical address after the memory device is shut down and recovered;

wherein the at least one memory block is at least one blank block of the plurality of memory blocks;

wherein the at least one storing block is stored from an end of the memory space of the memory device.

6. The memory device of claim 5, wherein the management process further comprises:

reading data corresponding to the at least one physical address according to the at least one physical address of the at least one storing block.

7. The memory device of claim 5, wherein the at least one metadata corresponds to pointer data of the at least one storing block.

8. The memory device of claim 5, wherein the management process further comprises:

establishing a link list to link the at least one storing block when a size of the at least one metadata exceeds a storage space of the mapping table.

* * * * *